(12) United States Patent
Das et al.

(10) Patent No.: US 7,133,688 B2
(45) Date of Patent: Nov. 7, 2006

(54) METHOD FOR IMPROVING UPLINK CONTROL CHANNEL EFFICIENCY IN A WIRELESS COMMUNICATION SYSTEM

(75) Inventors: Arnab Das, Old Bridge, NJ (US); Nandu Gopalakrishnan, Murray Hill, NJ (US); Farooq Ullah Khan, Manapalan, NJ (US); Wenfeng Zhang, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 458 days.

(21) Appl. No.: 10/117,508

(22) Filed: Apr. 5, 2002

(65) Prior Publication Data

US 2004/0203980 A1 Oct. 14, 2004

(51) Int. Cl.
*H04B 17/00* (2006.01)
*H04B 7/00* (2006.01)
*H04J 3/00* (2006.01)
*H04Q 7/20* (2006.01)

(52) U.S. Cl. .............. 455/522; 455/67.11; 370/345

(58) Field of Classification Search .............. 455/522, 455/450, 436, 442, 13.4, 69, 67.11; 370/278, 370/345, 347, 318, 335
See application file for complete search history.

(56) References Cited

U.S. PATENT DOCUMENTS

| 6,856,604 | B1* | 2/2005 | Lundby | 370/312 |
|---|---|---|---|---|
| 2002/0136193 | A1* | 9/2002 | Chang et al. | 370/347 |
| 2003/0185159 | A1* | 10/2003 | Seo et al. | 370/278 |
| 2003/0185181 | A1* | 10/2003 | Balachandran et al. | 370/337 |
| 2004/0013103 | A1* | 1/2004 | Zhang et al. | 370/345 |
| 2004/0100921 | A1* | 5/2004 | Khan | 370/321 |
| 2005/0037796 | A1* | 2/2005 | Tsai et al. | 455/522 |

OTHER PUBLICATIONS

3GPP TSG-RAN WG1 # 23: Tdoc R1-02-003 "UL Power Control for HSDPA" by: Samsung: Espoo, Finland, Jan. 8-11, 2002.*
3GPP TSG-RAN WG1 # 24: Tdoc R1-02-0421 "Energy requirements for UL HS-DPCCH signaling with and without special pilot bits" by: Lucent Technologies: Orlando, USA, Feb. 18-22, 2002.*

* cited by examiner

Primary Examiner—Edan Orgad

(57) ABSTRACT

A method of using a generated pilot signal inserted in a CQF slot of an uplink signaling channel to control the transmission power of data information independently of the transmission power of voice information regardless of whether the voice and data information are transmitted simultaneously.

8 Claims, 3 Drawing Sheets

METHOD FOR IMPROVING UPLINK CONTROL CHANNEL EFFICIENCY IN A WIRELESS COMMUNICATION SYSTEM

BACKGROUND OF THE INVENTION

1. Field of the Invention

The present invention generally relates to communication systems and in particular to wireless communication systems.

2. Description of the Related Art

As wireless communication systems evolve, there is an increasing need to accommodate wireless communication systems that not only convey (i.e., transmit and/or receive) voice but also allow data information to be conveyed between users of the communication system. The data information is various types of digital information such as text, graphics and other digital information that are typically not time sensitive. Information such as voice or video are time sensitive in that once transmission has commenced there can be no appreciable delay in subsequent transmissions. Any appreciable delay in consecutive transmissions of the time sensitive information causes the information to become unintelligible to a receiving user equipment (i.e., a mobile station). Data information, on the other hand, can tolerate delays in consecutive transmissions and thus can be processed differently from time sensitive signals.

Wireless communication systems, such as systems that comply with the well known 1x-EV-DO (CDMA 2001x-Evolution-Data Optimized) and 1xEV-DV (CDMA2001x-Evolution-Data Voice) standards as well as the High Speed Downlink Packet Access (HSDPA) specification in the Universal Mobile Telecommunication System (UMTS) standard can accommodate the conveyance of data information and are hereinafter referred to wireless data systems. A standard is a set of protocols established by standard bodies such as industry groups and/or governmental regulatory bodies. A protocol is generally a set of rules that dictate how communication is to be initiated, maintained and terminated between system equipment and/or user equipment of the communication system. The wireless data systems are structured in substantially the same manner as other wireless communication systems in that they comprise a plurality of base stations located in cells. A cell is a geographical area defined by physical boundaries. Each cell has base station equipment (or cell site) that services user equipment (UE) located in that cell. The UE is being serviced when the base station equipment provides the UE with appropriate amounts of various resources (e.g., power, bandwidth) to enable the UE to convey adequately information to other users or other system equipment. Base station equipment is generally system equipment comprising communication equipment (e.g., radio transmitters, receivers, processing equipment) owned, controlled and operated by system providers. System providers are entities such as local telephone companies, long distance telephone companies, Internet Service Providers (ISP) and other communication service providers. Examples of UE include cellular telephones, pagers and wireless personal computers.

A UE receives information from base station equipment over a downlink and transmits information to base station equipment over an uplink. The uplink comprises at least one traffic channel and at least one signaling channel. Similarly, the downlink comprises at least one signaling channel and at least one traffic channel. The traffic channel is a communication channel over which user information or traffic channel information (e.g., voice, video, data) is conveyed between UEs and system equipment of the communication system. The signaling channels are communication channels used by the system to manage, and otherwise control the operation of communication channels of the communication system. In a communication system that is to comply with the UMTS HSDPA developing standard, a key downlink signaling channel is called the High Speed Shared Control CHannel (HS-SCCH) and a key uplink signaling channel is called the High Speed Dedicated Physical Control CHannel (HS-DPCCH). The signaling information conveyed over the HS-SCCH and the HS-DPCCH is referred to as control information.

In communication systems to comply with the UMTS HSDPA standard (being developed), control information sent over the HS-SCCH (downlink signaling channel) and the HS-DPCCH (uplink signaling channel) are transmitted during a time interval called a Transmit Time Interval (TTI). The TTI is divided into three equal slots. Typically, for UMTS systems the TTI is 2 ms in length whereby each slot is ⅔ ms in length. For the HS-DPCCH, each slot contains 10 bits of information. The information contained in the HS-DPCCH slots are used by the UE to feedback measured information about the downlink channel and success of previous transmissions to adequately manage the amount of power to be allocated to downlink traffic signals transmitted to a UE. Other information contained in the HS-DPCCH slots are proposed to be used by the system to adequately manage the amount of power allocated to the uplink control and/or data and/or other traffic signals transmitted by a UE. In general these information are used to properly manage communications between the UE and the base station servicing the UE. In particular, the first slot contains ACK/NACK information which is acknowledgment information transmitted by the UE to its servicing base station ACKnowledging or Not ACKnowledging the proper reception of traffic channel information from the base station. The remaining two slots, which contain 5 bits of information coded to 20 channel bits (10 bits/slot) are used for CQI (Channel Quality Indicator) information. CQI is also known Channel Quality Feedback (CQF) information. The CQF is information transmitted by the UE to the base station to indicate the relative quality of the signals received by the UE over the downlink.

The servicing base station modifies its transmitted signals based on the CQF information it receives from the UE; in this manner the quality of the downlink signals is adequately maintained to enable the UE to properly receive downlink signals from the servicing base station. In UMTS, 1 bit is actually used for the ACK/NACK and 5 bits are actually used for the CQF. Thus, there are 32 levels of downlink channel quality where level 0 indicates a relatively very low quality signal being received from the base station and level 31 indicates a relatively very high quality signals being received from the base station over the downlink. The CQF thus helps the base station control the quality of the downlink signals. The 5 CQF bits are channel coded into 20 bits to protect the CQF from becoming erroneous when it is propagating through the HS-DPCCH. Channel coding is a well known technique of introducing redundancy in a block of data to protect the data from error causing noise in a communication channel through which the data is transmitted.

To control the quality of the uplink signals, the base station uses another (legacy) signaling channel called the UL-DPCCH (Uplink Dedicated Physical Control Channel) that contains a pilot channel. The pilot channel contains a pilot signal that is periodically transmitted by the UE being serviced by the base station; this pilot signal is hereinafter referred to as the 'legacy pilot.' Based on the power of the legacy pilot signal received by the base station over the uplink pilot channel, the base station sends a legacy pilot power control signal over another "legacy" downlink control channel called the DL-DPCCH (Downlink Dedicated Physical Control Channel) typically instructing or commanding the UE to increase, or decrease the power of its signals being transmitted over the uplink control/traffic channel. The legacy pilot power control command signal is sent during each of the three slots of the HS-DPCCH TTI. The legacy pilot signal is thus used, inter alia, as a reference signal for controlling the proper transmission power of uplink signals. It should be noted that the legacy pilot signal is used for other purposes which are not discussed herein as these purposes are not within the scope of this invention.

The UE sometimes enters into a state called a handoff in which the UE is being serviced by more than one base station simultaneously. Several base stations receive the legacy pilot signal and transmit legacy pilot power control signals to the UE. At this point the UE is transmitting information (signaling and traffic information) to several base stations simultaneously. The traffic channel information received by each of the base stations are transferred to system processing equipment which combine the various received traffic information to obtain the correct block of information that was sent. However, each of the base station is transmitting a legacy pilot power control signal command that may be contradictory to other legacy pilot power control signal commands from the other base stations in handoff with the UE. For example one base station may send an 'increase power command' while another base station sends a 'decrease power command.' To overcome this contradiction in legacy pilot control signal commands, the system typically adopts an "Or of the Down" algorithm. In the "Or of the Down" algorithm, the UE will decrease its transmit power if any of the base stations with which it is in handoff transmits a legacy pilot power control command indicating 'decrease power.' The UE will increase its transmit power only if all of the base station with which it is in handoff transmit an 'increase power' command.

While in handoff with several base stations, the UE may also be receiving data information from another base station (e.g. HSDPA serving base station) over a data traffic channel (e.g. HS-DSCH or High Speed Downlink Shared Channel). At this point in the development of wireless data communication systems (i.e., systems that convey voice and data simultaneously), there is no handoff procedure for packet data traffic (e.g. HSDPA). For example, only one HSDPA serving base station sends packet data at a time on the HS-DSCH traffic channel to the UE. In turn, the UE sends control information and/or packet data to only one base station (e.g. HSDPA) at a time, for example, on the HS-DPCCH . However, the power allocated to the uplink pilot signal does have a direct proportional effect on the power of the control signals being sent over the HS-DPCCH because it is the pilot signal that is used to control the power allocated to the entire uplink. Therefore, a UE in handoff may be decreasing its transmit power due to commands processed in accordance with the "OR of the Down" algorithm while at the same time the base station (HSDPA) which is receiving control information/packet data from the UE needs the transmit power to be increased. Therefore, a contradictory situation can exist while a UE, which is capable of transmitting/receiving both data and voice, is in handoff.

One proposed technique that attempts to address the contradictory problem is to create another pilot signal called the High Speed pilot (HS pilot signal) signal that is used to control uplink transmit power of HSDPA related control information and/or other packet data signals independently of the transmit power of voice, circuit data or other such legacy signals. The HSDPA base station communicating with the UE and receiving the HS pilot signal will transmit HS pilot power control commands signals instructing or commanding the UE to either increase, maintain or decrease its transmit power for the HSDPA related control and/or other packet data signals. The HS pilot power control commands are transmitted during one of the slots of the downlink TTI (DL-DPCCH) replacing one of the legacy pilot control signals. Thus, with this technique, an HS pilot power control signal is transmitted every third slot of the HS-DPCCH TTI while the legacy pilot control signal is transmitted during two slots for every TTI. This technique is not very invasive because only one slot of the legacy pilot control signal is 'stolen' for the use of the HS pilot signal. The power of the legacy pilot signal and thus the power of the uplink for voice, circuit data and other such legacy signals will still be controlled but at a slightly lesser rate.

In the proposed technique, the HS pilot signal is inserted in part of the first slot of the HS-DPCCH. The first slot, as previously discussed, contains the ACK/NACK which is represented by 1 bit of information that is coded to 10 bits. Typically a "1" bit represents an ACK response and a "0" bit represents a NACK response. The coding done is to duplicate the response so that an ACK becomes "1111111111" (10 "1" bits) while a NACK becomes "0000000000" (i.e., 10 "0" bits). It is well known that the best coding that can be done for a one bit piece of information is to simply replicate that one bit. Further, this type of coding is not a very robust type of coding in that it is relatively quite vulnerable to noise in the channel within which it is transmitted. Yet further, the required bit error rate for the ACK/NACK slot is typically on the order of $10^{-4}$ or less. In other words, for every 10,000 bits of ACK/NACK information that is sent only one erroneous bit is allowed. The bit error rate requirement for the ACK/NACK is relatively quite stringent because the ACK/NACK signal is crucial in managing the efficiency (in terms of power and bandwidth) of the system downlink. Thus, the usage of some of the ACK/NACK bits for the HS pilot signal will most likely damage the reliability of the ACK/NACK information received by a base station and reduce the base station's ability to efficiently manage the downlink resources.

SUMMARY OF THE INVENTION

The present invention provides a method for generating a pilot signal that is inserted in a portion of a transmission slot reserved for channel quality feedback information where the pilot signal can be used to control transmission power of one type of information independently of the transmission power of other types of information where the one type of information and the other types of information can be transmitted simultaneously. The pilot is transmitted along with the quality feedback information and other signaling information to a receiver. The receiver decides on whether to respond to the transmission of the generated pilot with power control commands for the channel over which the generated pilot signal was transmitted or perform channel estimation of the channel over which the generated pilot signal was transmitted. The receiver determines whether the next transmitted pilot signal should be usable for power control. If it is decided that the next generated pilot signal is not to be usable for power control, then a pilot signal that is not necessarily usable for power control is generated and then transmitted to the receiver. A channel estimation based on the received pilot signal and/or legacy pilot signal or control signals is then performed for the channel over which this generated pilot signal was transmitted. However, if it was decided that the next generated pilot signal is to be usable for power control, a pilot signal is generated whose power is set according to a generated power control command and transmitted as before, i.e., inserted in a portion of a transmission slot reserved for channel quality feedback information. The use of the channel estimation technique or the power control technique can be used interchangeably, in alternate fashion or in any combination over a defined time period.

DETAILED DESCRIPTION

The present invention provides a method for generating a pilot signal that is inserted in a portion of a transmission slot reserved for channel quality feedback information where the pilot signal can be used to control transmission power of one type of information independently of the transmission power of other types of information where the one type of information and the other types of information can be transmitted simultaneously. The pilot is transmitted along with the quality feedback information and other signaling information to a receiver. The receiver decides on whether to respond to the transmission of the generated pilot with power control commands for the channel over which the generated pilot signal was transmitted or perform channel estimation of the channel over which the generated pilot signal was transmitted. The receiver determines whether the next transmitted pilot signal should be usable for power control. If it is decided that the next generated pilot signal is not to be usable for power control, then a pilot signal that is not necessarily usable for power control is generated and then transmitted to the receiver. A channel estimation based on the received pilot signal and/or legacy pilot signal or control signals is then performed for the channel over which this generated pilot signal was transmitted. However, if it was decided that the next generated pilot signal is to be usable for power control, a pilot signal is generated whose power is set according to a generated power control command and transmitted as before, i.e., inserted in a portion of a transmission slot reserved for channel quality feedback information. The use of the channel estimation technique or the power control technique can be used interchangeably, in alternate fashion or in any combination over a defined time period.

The method of the present invention will be discussed from the standpoint of a mobile (also called a UE or User Equipment) that is part of a wireless data system that complies with the UMTS standard. The mobile is transmitting control information with the inserted pilot signal over the HS-DPCCH (i.e. uplink signaling channel for UMTS HSDPA systems) to a base station (also called a Node-B in UMTS parlance). The mobile will hereinafter be referred to as the UE and the base station as the Node-B. Signaling information will hereinafter be referred to as control information. The mobile is capable of transmitting/receiving simultaneously voice (or circuit data) and data over traffic channels of the communication system. Circuit data is data information that is managed by dedicated signaling channels (i.e., non-shared) and conveyed over dedicated traffic channels (i.e., non-shared traffic channels).

Figure 1:
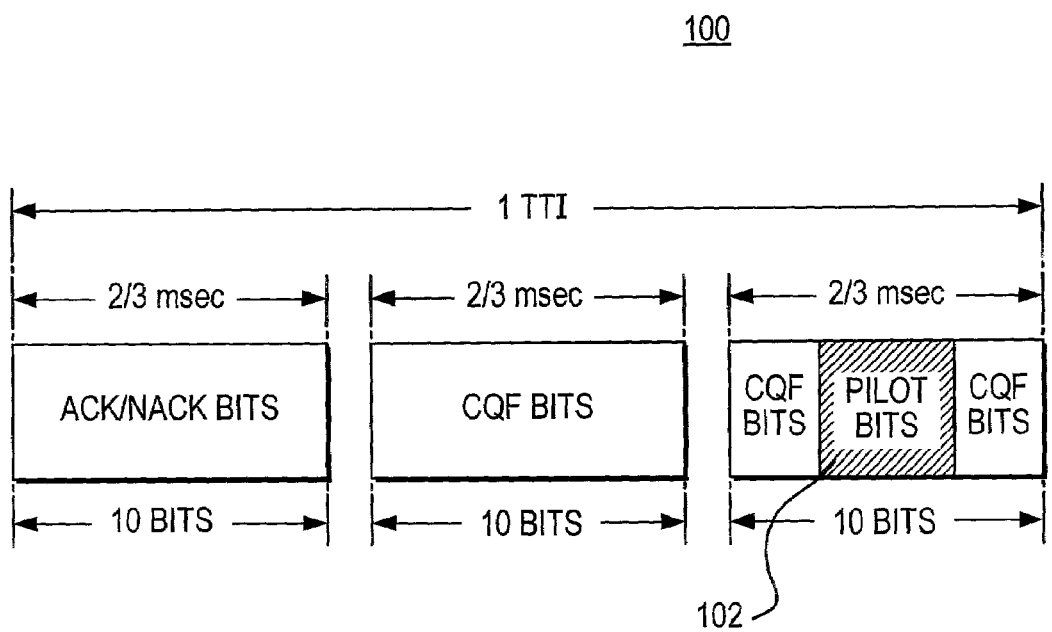
FIG. 1 depicts the format of control information wherein a generated pilot signal is inserted within a transmission slot reserved for channel quality feedback information.

Referring to FIG. 1, there is shown the format of an HS-DPCCH TTI 100 arranged in accordance with the method of the present invention. A pilot signal comprising 5 bits is inserted in one of the slots reserved for CQF information. Instead of having 20 bit coding for the 5-bit CQF information, 15-bit coding is now used. Thus 5 bits are 'stolen' from the CQF and are used to generate the pilot signal. The reduced number of bits used to code the 5-bit CQF does not significantly effect the operation of the CQF signal. The bit error rate requirement for the CQF signal is typically $10^{-2}$ meaning that one error for every 100 bits transmitted is allowed, which is a relatively not a very stringent error rate requirement. Further, relatively more robust coding can be used for the CQF as compared to the ACK/NACK which can use, at best, the not so robust coding of duplicating the ACK/NACK bit 10 times. The 5-bit pilot signal shown inserted in bit field 102 can be inserted in any position within any one of the two 10-bit slots reserved for CQF information.

Figure 2:
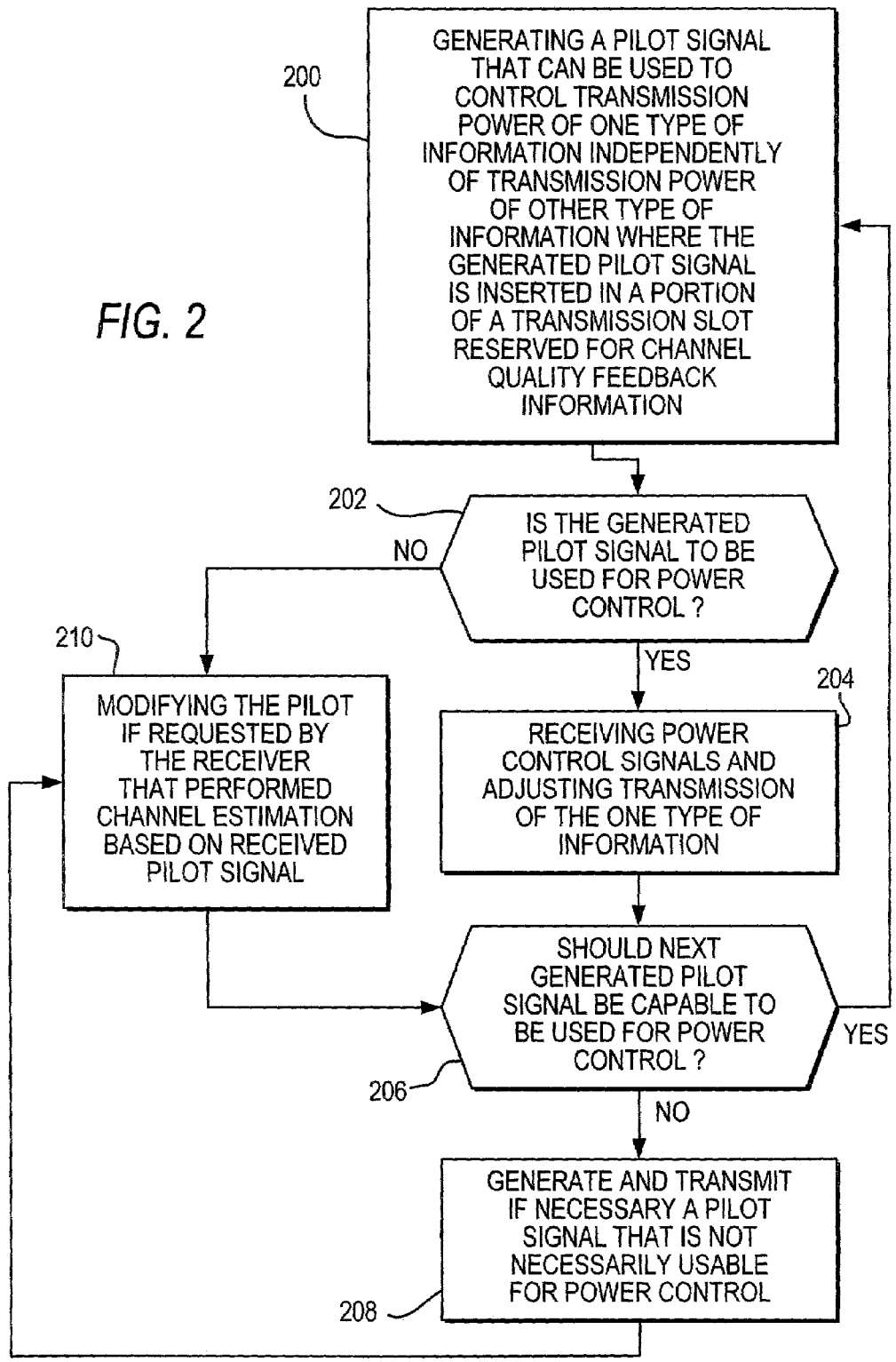
FIG. 2 shows a flow chart of the method of the present invention.

Referring now to FIG. 2, there is shown a flow chart of the method of the present invention. In step 200, a 5-bit pilot signal is generated and inserted in a portion of one of the CQF slots. It should be well understood that the method of the present invention does not at all limit the number of bits used for the pilot to 5. The generated pilot signal can be used to control transmission power of HSDPA related control and/or other packet data transmission independently of the transmission power of voice/circuit data information or any other type of information. The generated pilot signal is transmitted over the HS-DPCCH along with the ACK/NACK and the CQF signals. In the case where the UE is in handoff (with several Node-Bs) and is also conveying HSDPA control related information/packet data to a single specific HSDPA serving Node-B, the generated pilot signal is used by this HSDPA serving Node-B to transmit power control signal to the UE for adjusting the transmit power of the control information and/or other packet data that is being conveyed between them. The generated pilot signal is capable of being used for power control once received by the HSDPA Node-B because it is inserted in control information intended specifically for that Node-B. As such, the generated pilot signal can be used for power control if so decided by the Node-B. On the other hand the Node-B may decide not to power control. This decision of whether or not to power control is decided by the system and told to the UE a priori during call set up with occasional updates conveyed via upper layer messaging. After the generated pilot signal is transmitted by the UE, if it is understood by both system and UE that there will be this separate power control, the UE waits for power control information from the Node-B indicating power up or down based on the transmitted generated pilot signal.

In step 202, the UE determines the Node-B's decision on whether power control will be used by reviewing control information received from the Node-B. This decision of whether or not to power control is decided by the system and told to the UE a priori during call set up with occasional updates conveyed via upper layer messaging. When the Node-B decides to perform power control of the uplink based on the generated pilot signal, the Node-B informs the UE through upper layer signaling and the method of the present invention moves to 204. In step 204, the mobile waits for power control commands from the HSDPA Node-B and upon reception of such power control commands it adjusts its transmit power for the data information and control information (e.g. contained in HS-DPCCH) that it is transmitting to the HSDPA Node-B over the uplink. The adjustment is thus based on the received power control commands which are based on the generated pilot signal. The power control command is inserted in one of the slots previously reserved for power control commands related to a legacy pilot signal. In particular there is a power control signal related to a legacy pilot signal in each of the three slots of the HS-DPCCH TTI. One of these slots is now used for a power control command related to the generated pilot signal. Thus, a power control signal for the generated pilot signal is received on or after (depending on processing and propagation latency) every third slot of the HS-DPCCH TTI.

When the Node-B decides not to use power control based on the generated pilot signal, it so informs the UE who does not look for or wait for power control commands from the Node-B. This decision of whether or not to power control is decided by the system and told to the UE a priori during call set up with occasional updates conveyed via upper layer messaging. The method of the present now moves to step 210. In step 210, the Node-B performs channel estimation based on the generated pilot signal and/or control information such as ACK/NACK and one or more other pilot signals such as legacy pilot signals. The Node-B can send information to the UE instructing the UE on how to modify its uplink transmissions (control and traffic information). The modification is the altering in some manner the uplink data transmission (and uplink control transmissions) by the UE. The modification is not limited to adjustment of transmission power of the data information or control information. The UE modifies its uplink transmissions in accordance with any such instruction or request by the Node-B. Channel Estimation is a receiver procedure that acts on a priori known pilot bits and/or a priori unknown data with small number of ambiguities ((e.g. ACK/NACK) to estimate the gain or loss in power due to channel fading as well as the random phase rotation induced on the complex symbols that make up the received signals on one or multiple of the spatio-temporal paths of the channel. The channel gain/loss in power is compared against preset thresholds to issue power control commands and the learned phase rotation of the channel is oppositely applied (de-rotation) on the data bearing complex symbols of the received signal so as to cancel its effect and help in proper signal detection.

In step 206, the UE waits and obtains information from the Node-B as to whether the Node-B wants to receive a pilot signal capable of being used for power control. The information can be part of control information sent to the UE from the Node-B/system over the upper layer messages, a priori during call set up with occasional updates. Also, the system may decide to alternate between different pilot signal in which case the UE would know which type of pilot signal it is to generate and transmit during the next/subsequent set of HS-SCCH TTI. Further, the system may decide to use one type of pilot signal (one that is usable for power control) for a certain number, $N_1$, of HS-SCCH TTIs and another type of pilot signal (one not necessarily usable for power control) for a certain number, $N_2$ of consecutive HS-DPCCH TTIs where $N_1$ and $N_2$ are integers equal to 1 or greater. The adjusting of the transmission power of the data transmission based on power control commands can be performed over $N_1$ TTIs (or $N_1$ defined time periods) and the modification of uplink transmission (without power control commands) can be performed over $N_2$ TTIs (or $N_2$ defined time periods). If it was decided that the next generated pilot signal is to be usable for power control, the method of the present invention returns to step 200. If it is decided that the next generated pilot signal is not to be usable for power control, the method of the present invention moves to step 208 where a pilot signal is generated that is not necessarily usable for power control. Such a pilot signal can be generated in the exact manner as the pilot signal in step 200 except that the Node-B will not be transmitting any power control signals in any of the slots of the HS-DPCCH TTIs and the UE will not be looking for any such power control signal. Further the UE may not generate any pilot signal at all and allow the Node-B to generate a pilot signal from legacy any existing legacy pilot signals and an the ACK/NACK signal transmitted in the first slot of the HS-SCCH TTI.

In another embodiment the generated pilot signal is inserted into an entire CQF slot in alternate fashion thus transmitting channel quality information at a lesser rate than usual. In other words, for one TTI no CQF is sent and one or both slots reserved for CQF are used for the generated pilot signal. For the next TTI, the CQF is sent in the usual manner.

In yet another embodiment, any of the particular formats described above for the HS-DPCCH TTI in which the generated pilot signal is inserted in a portion of a CQF slot or in an entire one or two CQF slots is repeated for J TTIs, where J is an integer equal to 2 or greater. Also, the usual format for the HS-DPCCH (no inserted pilot in the CQF slots) is repeated for K TTIs where K is an integer equal to 2 or greater. K and J are not necessarily equal to each other.

Figure 3:
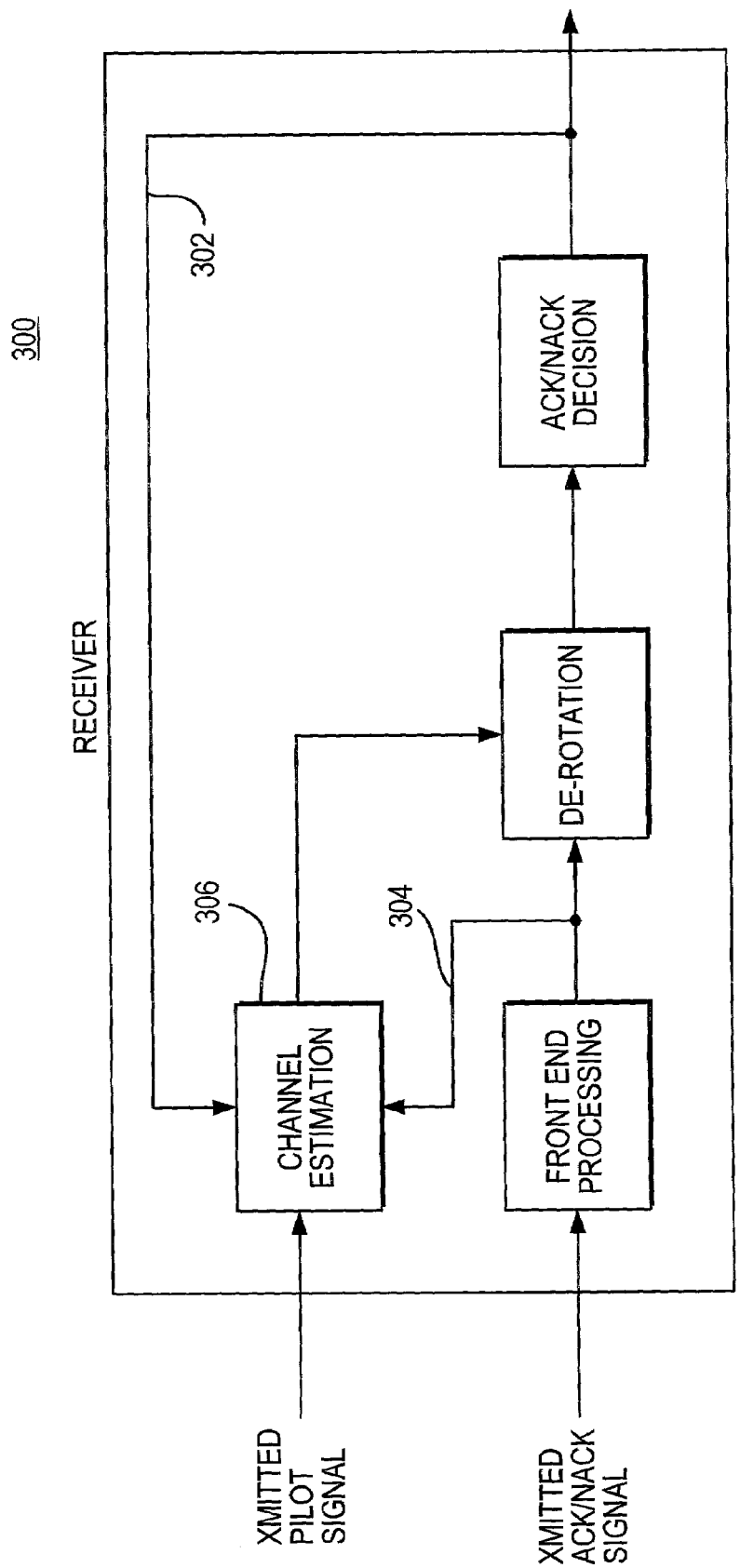
FIG. 3 shows a receiver structure for generating a received pilot signal from received ACK/NACK signals and at least one pilot signal.

In the case where the UE does not generate a pilot signal at all to the Node-B, the receiving base station may have a receiver structure that generates a "composite" pilot symbol for the HSDPA uplink from other uplink control signals. Referring to FIG. 3, there is shown receiver structure 300 which generates a "composite" pilot symbol from a legacy pilot signal and/or received ACK/NACK signal. The receiver structure can also use the generated pilot signal (in addition to the ACK/NACK and legacy pilot signal) to generate the composite pilot symbol. In particular, channel estimator 306 processes a transmitted pilot signal (generated pilot signal and/or legacy pilot signal) and reports an estimate of the channel gain and phase based on pilot measurement and the initial ACK/NACK decision (hypothesis with a 180° ambiguity) is based on this estimate. Subsequently, the ACK/NACK decision (hypothesis) is fed back (along path 302) to the channel estimator and the received ACK/NACK baseband symbol prior to de-rotation is also fed back (along path 304) to the channel estimator 306. Channel estimator 306 now uses the ACK/NACK decision hypothesis to multiply it with the received ACK/NACK symbol so as to erase the ACK/NACK information. The resulting symbol can be combined with the received pilot signal (processed) to improve its energy level (or SNR) and hence arrive at a better estimate of the channel. Such an estimate is passed on to the de-rotator and a new "improved" ACK/NACK decision (hypothesis) results. Iterating this process progressively improves the reliability of the ACK/NACK decision (hypothesis) if the previous hypotheses were correct. In this manner a somewhat steady pilot signal is created from received ACK/NACK signals and one or more pilot signals which can the generated pilot signal of the present invention or legacy pilot signals.

Referring back to FIG. 2, the method of the present invention then moves to step 210 where the UE waits for any instructions from the Node-B as to any modifications of its uplink signals (control information and/or traffic information) after a channel estimation is performed by the Node-B.

We claim:

1. A method of using a generated pilot signal that can be used to control transmission power of a first type of information independently of transmission power of a second type of information, the method comprising the step of:

inserting the generated pilot signal in a portion of a transmission slot reserved for channel quality feedback information where received transmission power control commands based on the generated pilot signal are used to control the transmission power of the first type of transmission that can be conveyed simultaneously with the second type of information over communication channels of a communication system.

2. The method of claim 1 further comprising adjusting the transmission power of the first type of information based on power control commands that are based on the generated pilot signal.

3. The method of claim 1 further comprising the step of modifying the first type of information due to channel estimation that is based on the generated pilot signal, control information transmitted along with the generated pilot signal and one or more pilot signals other than the one generated and where such modification is not based on any transmission power control command.

4. The method of claim 1 further comprising the step of inserting the generated pilot signal in an entire slot reserved for quality feedback in an alternate manner thus transmitting the quality feedback information at a lesser rate.

5. The method of claim 1 further comprising the step of performing channel estimation on based on signals in any slot or portions of any slots containing the generated pilot signal, control information transmitted along with the generated pilot signal and one or more pilot signals other than the generated pilot signal.

6. The method of claim 1 further comprising the step of adjusting, for $N_1$ defined time periods, the transmission power of the first type of information based on power control commands that are based on the generated pilot signal and modifying, for $N_2$ defined time periods, the first type of information where $N_1$ and $N_2$ are integers equal to 1 or greater.

7. The method of claim 1 further comprising the step of transmitting for J consecutive defined time periods in which the generated pilot signal is in one or more slots reserved for the channel quality feedback information and transmitting K consecutive defined time periods in which the generated pilot is not being used in any slots of the TTI where J and K are integers equal to 1 or greater.

8. The method of any one of claims 1 to 7 where the communication system is UMTS standard compliant and the generated pilot signal is a 5-bit block that is inserted in any portion of the CQF slot of an HS-DPCCH TTI and where the first type of information is data and the second type of information is voice and/or circuit data.

* * * * *